United States Patent
Igarashi

(10) Patent No.: US 7,216,667 B2
(45) Date of Patent: May 15, 2007

(54) VALVE OPENING/CLOSING HANDLE LOCK MECHANISM

(75) Inventor: Hiroki Igarashi, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 80 days.

(21) Appl. No.: 11/019,715

(22) Filed: Dec. 23, 2004

(65) Prior Publication Data

US 2005/0139264 A1  Jun. 30, 2005

(51) Int. Cl.
*F16K 35/00* (2006.01)
*G05G 5/00* (2006.01)

(52) U.S. Cl. .................. 137/383; 137/382; 70/179; 70/180

(58) Field of Classification Search ............... 137/382, 137/383; 70/178, 179, 180
See application file for complete search history.

(56) References Cited

U.S. PATENT DOCUMENTS 209,181 A * 10/1878 Miller .................... 292/307 B
1,003,211 A * 9/1911 Shepard ..................... 70/178
1,683,649 A * 9/1928 Belote ......................... 70/180
4,716,922 A * 1/1988 Camp ........................ 137/296
5,533,891 A * 7/1996 Pearl, II et al. ............. 431/154
6,041,813 A * 3/2000 Koch et al. ................. 137/383

* cited by examiner

*Primary Examiner*—A. Michael Chambers
(74) *Attorney, Agent, or Firm*—Browdy and Neimark, PLLC

(57) ABSTRACT

A valve opening/closing handle lock mechanism provided in a valve having a manually operated valve opening/closing handle (1) is capable of maintaining the security of the valve by preventing the valve from being opened or closed by accident or with malicious intent after completion of a proper opening/closing operation of the valve by means of the handle (1). The handle lock mechanism comprises a locking cap (4) mounted on the handle (1). The locking cap (4) functions to prevent the handle (1) from being operated, extends from the handle (1) to a handle mount portion (3) of the valve so as to cover the corresponding portion of the valve with the locking cap (4), and is provided with: an opening (5) through which an end portion of the handle (1) passes outward; or, a longitudinal groove through which the end portion of the opening/closing handle (1) slidably passes outward.

10 Claims, 3 Drawing Sheets

VALVE OPENING/CLOSING HANDLE LOCK MECHANISM

BACKGROUND OF THE INVENTION

1. Field of the Invention

The present invention relates to a valve opening/closing handle lock mechanism of a valve or shut-off cock, and more particularly to a valve opening/closing handle lock mechanism of a valve or shut-off cock, wherein the handle lock mechanism is provided in a valve or shut-off cock of a type incorporated in a flow passage of a fluid such as water, a liquid chemical, a gas and the like, wherein the valve opening/closing handle lock mechanism is manually operated to open and close the flow passage, and prevents the valve or shut-off cock from being opened or closed by accident or with malicious intent after completion of a proper opening/closing operation of the valve or shut-off cock.

2. Description of the Related Art

Used in various types of plants are various types of valves or shut-off cocks for opening/closing a flow passage of a fluid such as water, a liquid chemical, a gas and the like. Each of these valves or cocks is manually operated by means of a valve opening/closing handle. In the valve opening/closing operation of each valve or cock, the valve opening/closing handle is turned or rotated horizontally or vertically relative to a main body of the valve or shut-off cock (hereinafter referred to as the valve).

In installation, the valve is projected from the fluid passage or circuit outward. Due to this, there is a fear that: a worker moving along the fluid circuit is accidentally brought into contact with a valve opening/closing handle of the valve; and, performs a valve opening/closing operation of the valve by mistake. Further, since it is possible for anyone to perform a valve opening/closing operation of a conventional type of the valve (see Japanese Patent application Laid-open No. 2002-147646), there is a fear that the valve is operated with malicious intent or improperly operated by a person not skilled in the art after completion of a proper opening/closing operation of the valve. Consequently, up to the present day it is hard to keep the security of the valve.

As described above, in the conventional manually-operated valve provided with the manually-operated valve opening/closing handle, there is a problem or fear that: the valve opening/closing handle of the valve is accidentally or improperly operated by mistake or by accident, or operated with malicious intent after completion of a proper opening/closing operation of the valve, which makes it hard to keep the security of the valve in operation.

SUMMARY OF THE INVENTION

Under such circumstances, the present invention was made. Consequently, it is an object of the present invention to solve the above problem inherent in the prior art by providing: a valve opening/closing handle lock mechanism of a valve, wherein the handle lock mechanism is installed in the valve provided with a manually-operated opening/closing handle which is free from any fear that an opening/closing operation of the handle is improperly or accidentally performed with or without malicious intent after completion of a proper opening/closing operation of the valve, so that the security of the valve may be properly kept.

More particularly, the above problem is solved by providing: a valve opening/closing handle lock mechanism of a valve for performing a valve opening/closing operation of a flow passage, comprising a locking cap (4) mounted on a valve opening/closing handle (1) of the valve, wherein: the valve opening/closing handle lock mechanism functions to prevent the valve opening/closing operation carried out by means of the valve opening/closing handle (1) from being carried out; and, the valve opening/closing handle (1) of the valve is mounted on a handle installation portion of the valve.

In the valve opening/closing handle lock mechanism as described above, the locking cap (4) is mounted on the valve opening/closing handle (1) of the valve to extend from the valve opening/closing handle (1) to the handle installation portion of the valve so as to cover the corresponding portion of the valve with the locking cap. The locking cap (4) is provided with an opening passing through an end portion of the valve opening/closing handle (1) of the valve. The locking cap (4) is provided with a longitudinal groove (14) through which the end portion of the valve opening/closing handle (1) of the valve slidably passes.

The locking cap (4) is fixedly mounted the handle installation portion of the valve by means of a setscrew (6). The locking cap (4) is threadably engaged with the handle installation portion of the valve. The locking cap (4) is engaged with the handle installation portion of the valve by means of concave/convex portions of them. Further, the locking cap (4) is provided with a key means for preventing the locking cap (4) from being pulled out of the valve opening/closing handle (1) of the valve.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Embodiments of a valve opening/closing handle lock mechanism according to the present invention shown in FIGS. 1, 3, 4 and 5 relate to a type having a valve opening/closing handle 1 of a valve or shut-off cock is turned or rotated by an angle of 90 degrees or 180 degrees in a vertical plane. On the other hand, embodiment shown in FIGS. 2, 6 and 7 relate to another type having the valve opening/closing handle 1 thereof is turned or rotated in a horizontal plane.

First of all, a first embodiment of the valve opening/closing handle lock mechanism according to the present invention shown in FIG. 1 will be described.

The valve opening/closing handle 1 of the valve or shut-off cock is mounted on a handle installation portion 3 of the valve in a manner such that the handle 1 is rotatable by an angle of 90 degrees in the vertical plane so as to assume each of an upright position and a fallen position. When the valve opening/closing handle 1 of the valve assumes the upright position as shown in solid lines in FIG. 1(A), a flow passage of the valve is closed. On the other hand, when the handle 1 of the valve assumes the fallen position as shown in phantom lines in FIG. 1(A), the flow passage of the valve is opened. It is also possible to set the valve in a manner such that: when the handle 1 of the valve assumes the upright position as shown in solid lines in FIG. 1(A), a flow passage is opened; and, when the handle 1 of the valve assumes the fallen position as shown in phantom lines in FIG. 1(A), the flow passage is closed. Anyway, in the following embodiments, it is clear that the valve opening/closing handle 1 may be reversely operated to effect a reverse one of valve opening/closing operations to open/close the flow passage of the valve.

Figure 1A:
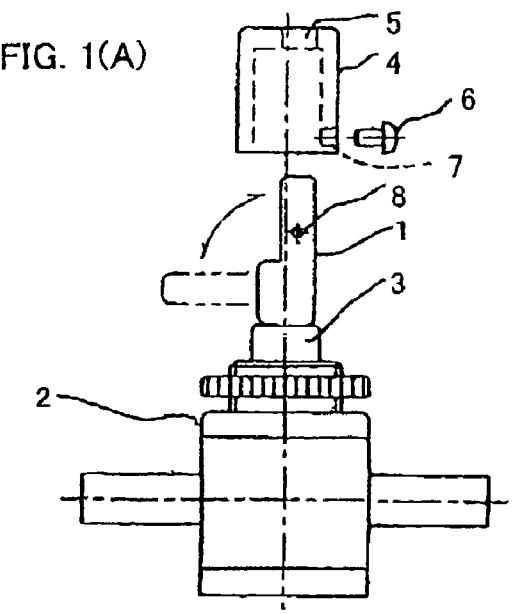
FIG. 1(A) is a front view of a first embodiment of the valve opening/closing handle lock mechanism of the present invention, illustrating in solid lines and phantom lines various positions of the valve opening/closing handle.

The reference numeral 4 denotes a locking cap. When the valve opening/closing handle 1 assumes its upright position, the locking cap 4 is mounted on the valve opening/closing handle 1 to extend from the handle 1 to the handle installation portion 3 of the valve so as to cover the corresponding portion of the valve with the locking cap 4. The locking cap 4 is provided with an opening 5 in its top wall to permit the valve opening/closing handle 1 to pass through the opening 4 when the handle 1 assumes its upright position, as shown in FIG. 1(A). Preferably, the locking cap 4 is further provided with a threaded hole 7 in its upper portion. A setscrew 6 extends in a lateral direction, and is threadably engaged with the threaded hole 7 of the locking cap 4.

Figure 1B:
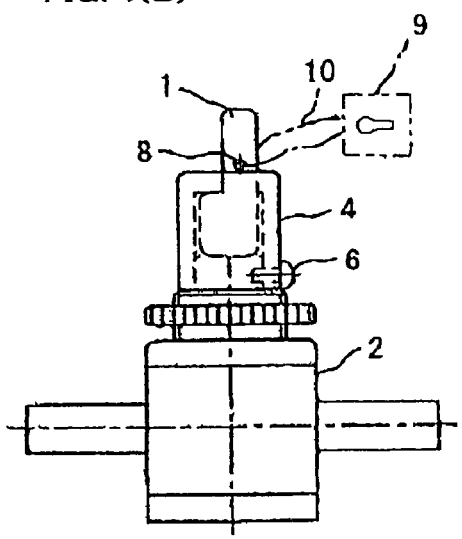
FIG. 1(B) is a side view of the first embodiment shown in FIG. 1(A)

In operation of this first embodiment, the valve opening/closing handle 1 is pulled up to assume its upright position (or fallen position) in a vertical plane, so that the flow passage 2 of the valve is opened (or closed). In order to keep the valve opening/closing handle 1 in such position, it is suffice to mount the locking cap 4 on the valve opening/closing handle 1 so as to extend from the valve opening/closing handle 1 to the handle installation portion 3 of the valve so as to cover the corresponding portion of the valve with the locking cap 4, as shown in FIG. 1(B). In other words, by merely mounting the locking cap 4 on the valve opening/closing handle 1, it is possible to prevent the valve opening/closing handle 1 from rotating relative to the main body of the valve since an upper portion of the valve opening/closing handle 1 passes through the opening 5 of the locking cap 4 upward. Further, in order to fixedly mount the locking cap 4 onto the main body of the valve, the setscrew 6 is threadably engaged with the threaded hole 7 of the locking cap 4 and further threadably engaged with the handle installation portion 3 of the valve.

It is also possible to improve the valve opening/closing handle lock mechanism of the present invention in security by restricting the operators of the valve only to an authorized person. For example, this is simply realized by: providing a through-hole or insertion hole 8 in a projection portion of the valve opening/closing handle 1 projecting upward from the opening 5 of the locking cap 4; passing a wire 10 of a wire-type key unit 9 through the insertion hole 8 of the valve opening/closing handle 1; and, locking the wire 10 to the valve opening/closing handle 1 by means of a key of the wire-type key unit 9.

Figure 2A:
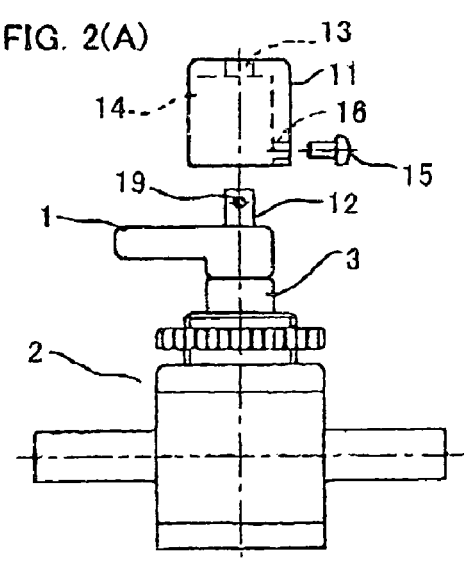
FIG. 2(A) is a front view of a second embodiment of the valve opening/closing handle lock mechanism, illustrating the locking cap having been separated from the valve opening/closing handle of the mechanism.
Figure 2B:
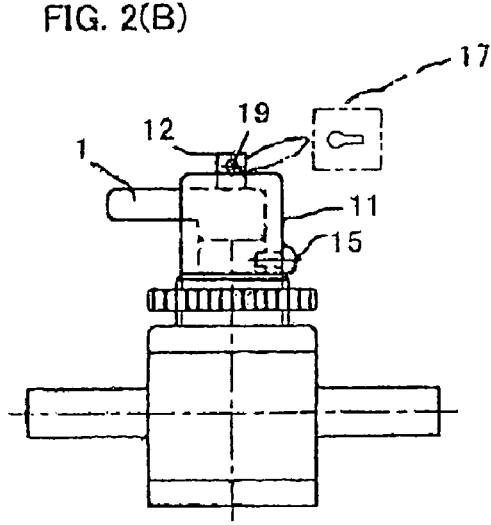
FIG. 2(B) is a side view of the second embodiment shown in FIG. 2(A), illustrating the locking cap already mounted on the valve opening/closing handle.

In a second embodiment of the present invention shown in FIGS. 2(A) and 2(B), the valve opening/closing handle 1 is rotated and held in a horizontal plane. In this case, the locking cap 11 is mounted on the valve opening/closing handle 1 to extend from the valve opening/closing handle 1 to the handle installation portion 3 of the valve so as to cover the corresponding portion of the valve with the locking cap 11.

This locking cap 11 is provided with: an opening 13 in its upper end portion, through which opening 13 a projection portion 12 provided in a side surface of the valve opening/closing handle 1 passes upward; and, a longitudinal groove 14, which is provided in a side wall of the locking cap 11, permits the valve opening/closing handle 1 to escape out of the locking cap 11. Further, preferably a threaded hole 16 is provided in a lower portion of the locking cap 11 to threadably engage with a setscrew 15.

In this second embodiment of the present invention, the valve opening/closing handle 1 is rotated in a horizontal plane to open/close the flow passage 2 of the valve and keep the opened/closed state of the flow passage 2. In order to keep the flow passage 2 in its opened/closed state or condition, the locking cap 22 is mounted on the valve opening/closing handle 1 from upside to extend from the valve opening/closing handle 1 to the handle installation portion 3 of the valve so as to cover the corresponding portion of the valve or shut-off cock, as shown in FIG. 2(B). In other words, by covering the corresponding portion of the valve with the locking cap 4, it is possible to hold the valve opening/closing handle 1 in the longitudinal groove 14 and thereby preventing the handle 1 from rotating in a horizontal plane. Further, in order to keep the valve opening/closing handle 1 in its held position without fail, the setscrew 15 is threadably engaged with the threaded hole 16 of the locking cap 11 and further threadably engaged with the handle installation portion 3 of the valve or shut-off cock.

Further, as is in the first embodiment, in order to keep the security of the valve in this second embodiment, it is possible to use the wire-type key unit 17 for locking the valve opening/closing handle 1 by means of a key of the wire-type key unit 17. In the second embodiment of the present invention, a through-hole or insertion hole 19 is provided in the projection portion 12 of the valve opening/closing handle 1, which projection portion 12 projects upward from the opening 13 of the locking cap 11 to permit the wire 18 to pass through the insertion hole 19 of the projection portion 12 of the valve opening/closing handle 1.

Figure 3A:
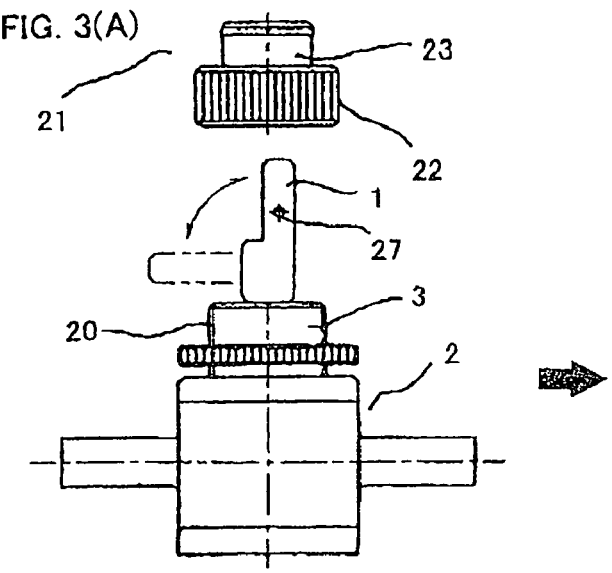
FIG. 3(A) is a front view of a third embodiment of the present invention, illustrating in solid lines and phantom lines various positions of the valve opening/closing handle of the valve opening/closing handle lock mechanism.
Figure 3B:
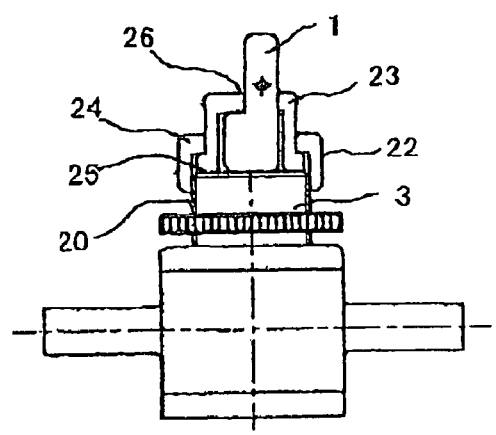
FIG. 3(B) is a side view of the third embodiment shown in FIG. 3(A)

A third embodiment of the present invention is shown in FIGS. 3(A) and 3(B), and designed to lock the valve opening/closing handle 1 to the handle installation portion 3 of the valve in the upright position of the handle 1 by means of the locking cap 21. This locking cap 21 is constructed of: an annular threaded member or ring 22, which is threadably engaged with a male screw portion 20 of the handle installation portion 3 of the valve; and, an inner sleeve 23 supported inside the threaded ring 22. The inner sleeve 23 is provided with an outer flange portion 25 in its lower end portion, which outer flange portion 25 is engaged with an inner flange portion 24 formed in an upper surface of the threaded ring 22 to prevent the inner sleeve 23 from being pulled out of the threaded ring 22 upward as viewed in FIG. 3(B). The inner sleeve 23 is provided with an opening 26 in its upper surface for permitting the valve opening/closing handle 1 to extend upward from the opening 26.

In the case of this third embodiment, in order to open/close the flow passage 2 and keep the flow passage 2 in such opened/closed condition: the valve opening/closing handle 1 is passed through the opening 26 of the inner sleeve 23 upward; the locking cap 21 is mounted on the valve opening/closing handle 1 from upside to extend from the handle 1 to the handle installation portion 3 of the valve so as to cover the corresponding portion of the valve with the locking cap 21; and, then the threaded ring 22 is threadably engaged with a male screw portion 20 of the handle installation portion 3 of the valve to lock the valve opening/closing handle 1 to the handle installation portion 3 of the valve. This makes it impossible to rotate the valve opening/closing handle 1 relative to the handle installation portion 3 of the valve by accident.

Further, as is in the case of each of the first and the second embodiment, it is also possible for the third embodiment to use the wire-type key unit (not shown) to keep the security of the valve opening/closing handle 1 of the valve by locking the handle 1 by means of the wire of the wire-type key unit. In this case, a projection portion of the valve opening/closing handle 1, which portion extends upward from the opening 26 of the inner sleeve 23, is provided with an insertion hole 27 for permitting the wire of the wire-type key unit (not shown) to pass through such insertion hole 27 of the valve opening/closing handle 1.

Figure 4A:
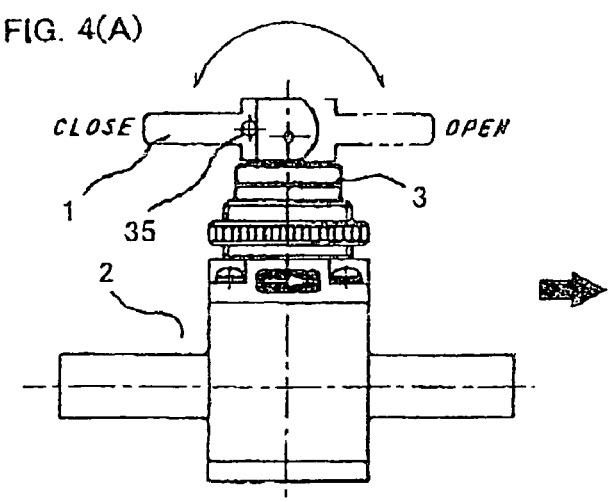
FIG. 4(A) is a front view of a fourth embodiment of the valve opening/closing handle lock mechanism of the present invention, illustrating in solid lines and phantom lines various positions of the valve opening/closing handle.

A fourth embodiment of the present invention is shown in FIGS. 4(A), 4(B), 5(A) and 5(B), and relates to the valve of a type permitting the valve opening/closing handle 1 to rotate in a vertical plane by an angle of 180 degrees for opening/closing the flow passage 2 passing through the main body of the valve, as viewed in FIG. 4(A). In this fourth embodiment shown in the drawings: when the valve opening/closing handle 1 is turned to the left in the vertical plane as shown in solid lines in FIG. 4(A), the flow passage 2 of the valve is closed; and, when the valve opening/closing handle 1 is turned to the right in the vertical plane as shown in phantom lines in FIG. 4(A), the flow passage 2 of the valve is opened. In this fourth embodiment, the locking cap 31 is used to keep the flow passage 2 from opening in operation.

Figure 5A:
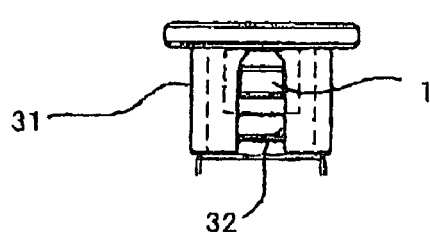
FIG. 5(A) is a front view of a fifth embodiment of the valve opening/closing handle lock mechanism of the present invention.
Figure 5B:
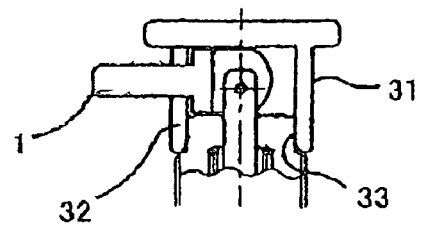
FIG. 5(B) is a side view of the fifth embodiment shown in FIG. 5(A)

As is clear from FIG. 5(B), the locking cap 31 is provided with a longitudinal groove 32 for permitting the valve opening/closing handle 1 to escape the locking cap 31 when the cap 31 is mounted on the handle 1 from upside. Preferably, the locking cap 31 is engaged with the handle installation portion 3 of the valve by means of concave/convex portions 33 of them. More specifically, such concave/convex portions 33 are provided in both an inner surface of the locking cap 31 and an outer surface of the handle installation portion 3 of the valve, wherein the outer surface of the handle installation portion 3 abuts against the inner surface of the locking cap 31. The concave/convex portions 33 of the locking cap 31 and the handle installation portion 3 of the valve may function to prevent the locking cap 31 from dropping out of the handle installation portion 3 of the valve.

In the case of this fourth embodiment: the valve opening/closing handle 1 is rotated to its horizontal position in the vertical plane to open/close the flow passage 2 of the valve; in order to keep the flow passage 2 of the valve in such opened/closed condition, the locking cap 31 is mounted on the valve opening/closing handle 1 to extend from the handle 1 to the handle installation portion 3 of the valve so as to cover the corresponding portion of the valve with the locking cap 31. At this time: the valve opening/closing handle 1 is received in the longitudinal groove 32 of the locking cap 31; and, the concave/convex portions 33 are engaged with each other to lock the valve opening/closing handle 1 to the handle installation portion 3 of the valve. As a result, unless the locking cap 31 is removed from the valve opening/closing handle 1, it is not possible for anyone to operate the valve opening/closing handle 1.

Figure 4B:
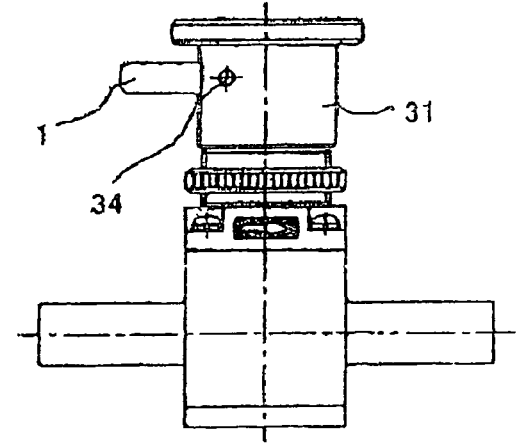
FIG. 4(B) is a side view of the fourth embodiment of the present invention shown in FIG. 4(A)

Further, as is in the previous embodiments, it is also possible for the fourth embodiment to use the wire-type key unit (not shown) in locking up the valve opening/closing handle 1 so as to keep the security of the valve. In the case of this fourth embodiment, as shown in FIG. 4(B), a through-hole or insertion hole 34 for receiving therein the wire of the wire-type key unit (not shown) is provided in a side surface of the locking cap 31. On the other hand, the valve opening/closing handle 1 is provided with a through-hole or insertion hole 35 which communicates with the corresponding insertion hole 34 of the locking cap 31.

Figure 6A:
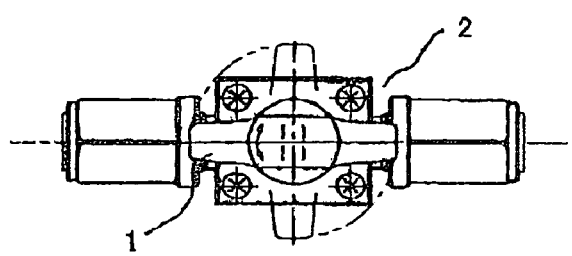
FIG. 6(A) is a plan view of a sixth embodiment of the valve opening/closing handle lock mechanism of the present invention, illustrating in solid lines and phantom lines various positions of the valve opening/closing handle.
Figure 6B:
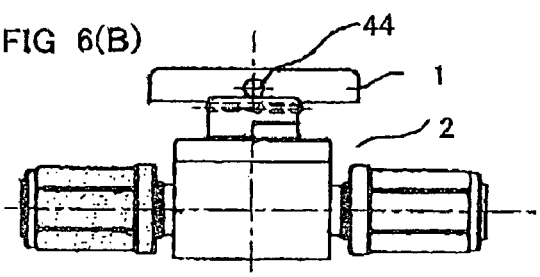
FIG. 6(B) is a side view of the sixth embodiment of the present invention shown in FIG. 6(A)
Figure 7A:
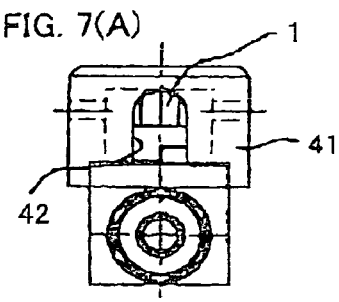
FIG. 7(A) is a front view of a seventh embodiment of the valve opening/closing handle lock mechanism of the present invention.
Figure 7B:
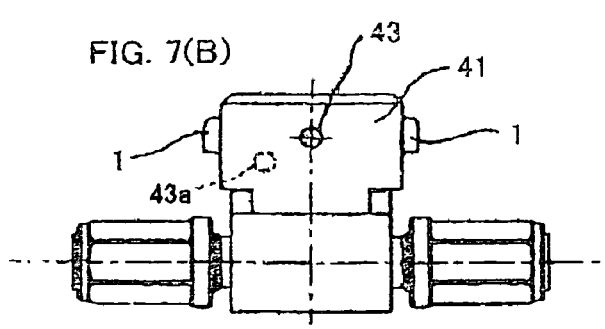
FIG. 7(B) is a side view of the seventh embodiment shown in FIG. 7(A).

A fifth embodiment of the present invention is shown in FIGS. 6(A), 6 (B), FIG. 7(A) and 7(B), and relates to the valve of a type permitting the valve opening/closing handle 1 to turn or rotate to the left and the right each by an angle of 90 degrees relative to the main body of the valve in a horizontal plane, as is clear from FIG. 6(A). In this fifth embodiment shown in the drawings: when the valve opening/closing handle 1 is turned so as to be in parallel with the length of the flow passage 2 in position as shown in solid lines in FIG. 6(A), the flow passage 2 of the valve is kept opened; and, when the valve opening/closing handle 1 is turned so as to be perpendicular to the length of the flow passage 2 in position as shown in phantom lines in FIG. 6(A), the flow passage 2 of the valve is kept closed. The locking cap 41 is used to keep the flow passage 2 of the valve opened/closed thus determined by the valve opening/closing handle 1.

The locking cap 41 is provided with a pair of longitudinal grooves 42 which are oppositely disposed from each other for permitting the opposite end portions of the valve opening/closing handle 1 to pass through these grooves 42 when the locking cap 41 is mounted on the valve opening/closing handle 1 from upper side.

In this fifth embodiment, in order to keep the flow passage 2 of the valve opened (or closed) after completion of turning operation of the valve opening/closing handle 1, the valve opening/closing handle 1 has its opposite end portions inserted into the longitudinal grooves 42 of the locking cap 41, so that the locking cap 41 is mounted on the handle 1 to extend from the handle 1 to the handle installation portion 3 so as to cover the corresponding portion of the valve with the locking cap 4, whereby the valve opening/closing handle 1 is locked to the main body of the valve or shut-off cock, and is therefore prevented from rotating relative to the main body of the valve.

Further, as is in the previous embodiment, it is also possible to key-lock this fifth embodiment by using the wire-type key (not shown) for security. In this fifth embodiment: a through-hole or insertion hole 43 for permitting a wire of the wire-type key (not shown) to pass through the locking cap 41 is provided in a side surface of the locking cap 41, as shown in FIG. 7(B); and, another through-hole or insertion hole 44, which communicates with the previous insertion hole 43, is also provided in the valve opening/closing handle 1. Incidentally, when the insertion hole 43 passes through a predetermined portion (denoted by the reference letter/numeral 43a) of the locking cap 41 to avoid the valve opening/closing handle 1, it is possible to omit the another insertion hole 44 in construction.

The effect of the present invention is as follows:

By providing the valve having the manually-operated valve opening/closing handle lock mechanism, it is possible for the user to lock the valve opening/closing handle 1 to the main body of the valve. This makes it possible for the user to prevent a valve opening/closing accident from occurring in the flow passage 2 of the valve by mistake, and also possible to prevent the valve opening/closing handle 1 of the valve or shut-off cock from being operated with malicious intent after completion of a proper opening/closing operation of the valve or shut-off cock.

Further, in addition to the above effect of the present invention, as described in the appended claims 5 to 7 of the subject application, the present invention may enjoy anther effect that the locking cap 4 is firmly fixed to the valve and is therefore substantially free from a fear that the locking cap 4 is dropped out of the valve. Further, as described in the appended claim 8, it is not possible for any person other than an authorized or eligible worker such as a key keeper of the locking cap 4 to operate the valve opening/closing handle 1 of the valve. Due to this, the valve opening/closing handle lock mechanism of the present invention is excellent in keeping the security of the valve or shut-off cock in use.

While the present invention has been particularly shown and described with reference to the preferred embodiments and a modification thereof, it will be understood by those skilled in the art that various modifications and changes may be made therein without departing from the spirit of the present invention as defined by the appended claims.

Finally, the present application claims the Convention Priority based on Japanese Patent Application No. 2003-427408 filed on Dec. 24, 2003, which is herein incorporated by reference.

EXPLANATIONS OF REFERENCE LETTERS OR NUMERALS

1: a valve opening/closing handle;
2: a main body of a valve or shut-off cock;
3: a handle installation portion;
4: a locking cap;
5: an opening;
6: a setscrew;
7: a threaded hole;
8: an insertion hole;
9: a wire-type key;
10: a wire
11: a locking cap;
12: a projection;
13: an opening;
14: a longitudinal groove;
15: a setscrew;
16: a threaded hole;
17: a wire-type key;
18: a wire;
19: an insertion hole;
20: a male screw portion;
21: a locking cap;
22: a threaded ring;
23: an inner sleeve;
24: an inner flange;
25: an outer flange; and
26: an opening.

What is claimed is:

1. A valve opening/closing handle lock mechanism engaged on a valve which opens and closes a flow passage (2), said valve having an opening/closing valve handle (1) rotatably engaged on a handle installation portion (3) fixed on the flow passage (2) to open and close the flow passage (2), said valve opening/closing handle lock mechanism comprising:

a cap (4) having, a horizontal top wall, an annular side wall perpendicular to the top wall and an open bottom, wherein the side wall extends over the valve handle (1) down to and over the handle installation portion (3), wherein the top wall has a hole (5) therethrough from which a portion of the valve handle (1) projects through; and wherein when the side wall is fixed to the handle installation portion (3) with the valve handle (1) projecting through the hole (5), the valve handle (1) cannot be rotated relative to the handle installation portion (3).

2. The valve opening/closing handle lock mechanism as set forth in claim 1, wherein said locking cap (4) is fixed to said handle installation portion of said valve by a setscrew (6).

3. The valve opening/closing handle lock mechanism as set forth in claim 1, wherein said locking cap (4) is threadably fixed with said handle installation portion of said valve.

4. The valve opening/closing handle lock mechanism as set forth in claim 1, wherein said locking cap (31) is engaged with said handle installation portion (3) of said valve by concave/convex portions (33) respectively located on the locking cup and handle installation portion.

5. The valve opening/closing handle lock mechanism as set forth in claim 1, wherein said locking cap (4) is provided with key apparatus to prevent said locking cap (4) from being separated from said valve opening/closing handle (1) of said valve.

6. A valve opening/closing handle lock mechanism engaged on a valve which opens and closes a flow passage (2), said valve having an opening/closing valve handle (1) rotatably engaged on a handle installation portion (3) fixed on the flow passage (2) to open and close the flow passage (2), said valve opening/closing handle lock mechanism comprising:

a cap (4) having a horizontal top wall, an annular side wall perpendicular to the top wall and an open bottom, wherein the side wall extends over the valve handle (1) down to and over the handle installation portion (3), wherein the side wall has a longitudinal slot (14) therethrough from which a portion of the valve handle (1) projects through; and wherein when the side wall is fixed to the handle installation portion (3) with the valve handle (1) projecting through the longitudinal slot (14), the valve handle (1) cannot be rotated relative to the handle installation portion (3).

7. The valve opening/closing handle lock mechanism as set forth in claim 6, wherein said locking cap (4) is fixed to said handle installation portion of said valve by a setscrew (6).

8. The valve opening/closing handle lock mechanism as set forth in claim 6, wherein said locking cap (4) is threadably fixed with said handle installation portion of said valve.

9. The valve opening/closing handle lock mechanism as set forth in claim 6, wherein said locking cap (31) is engaged with said handle installation portion (3) of said valve by concave/convex portions (33) respectively located on the locking cup and handle installation portion.

10. The valve opening/closing handle lock mechanism as set forth in claim 6, wherein said locking cap (4) is provided with key apparatus to prevent said locking cap (4) from being separated from said valve opening/closing handle (1) of said valve.

* * * * *